(12) United States Patent
Shin et al.

(10) Patent No.: US 12,422,174 B2
(45) Date of Patent: Sep. 23, 2025

(54) CONNECTOR AND VEHICLE HEAT EXCHANGER COMPRISING SAME

(71) Applicant: Hanon Systems, Daejeon (KR)

(72) Inventors: Sung Hong Shin, Daejeon (KR); Wontaek Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/266,666

(22) PCT Filed: Feb. 4, 2022

(86) PCT No.: PCT/KR2022/001728
§ 371 (c)(1),
(2) Date: Jun. 12, 2023

(87) PCT Pub. No.: WO2022/169280
PCT Pub. Date: Aug. 11, 2022

(65) Prior Publication Data
US 2024/0068719 A1    Feb. 29, 2024

(30) Foreign Application Priority Data

Feb. 5, 2021  (KR) .................. 10-2021-0016656
Jan. 28, 2022 (KR) .................. 10-2022-0013095

(51) Int. Cl.
*F25B 39/04*    (2006.01)

(52) U.S. Cl.
CPC ...... *F25B 39/04* (2013.01); *F25B 2339/0442* (2013.01); *F25B 2400/16* (2013.01)

(58) Field of Classification Search
CPC .............. F25B 39/04; F25B 2339/0442; F25B 2400/16
See application file for complete search history.

(56) References Cited

U.S. PATENT DOCUMENTS

2022/0325960 A1* 10/2022 Slavik .................... F28D 9/005

FOREIGN PATENT DOCUMENTS

| JP | 2006322636 A | 11/2006 |
|---|---|---|
| KR | 20040076018 A | 8/2004 |
| KR | 20050001841 A | 1/2005 |
| KR | 20070031052 A | 3/2007 |
| KR | 20170047963 A | 5/2017 |

OTHER PUBLICATIONS

International Search Report issued in PCT/KR2022/001728 on May 4, 2022.

* cited by examiner

*Primary Examiner* — Nael N Babaa
(74) *Attorney, Agent, or Firm* — NORTON ROSE FULBRIGHT US LLP

(57) ABSTRACT

The present invention relates to a connector provided between a condenser and a receiver driver and configured to fixedly couple the condenser and the receiver driver, and a vehicle heat exchanger including the same, and more particularly, to a connector capable of improving weldability between the receiver dryer side and the connector by means of a pipe-shaped clad plate or a ring-shaped clad seating member, and a vehicle heat exchanger including the same.

5 Claims, 17 Drawing Sheets

(a)   (b)

CONNECTOR AND VEHICLE HEAT EXCHANGER COMPRISING SAME

CROSS REFERENCE TO RELATED APPLICATIONS

This patent application is a national phase under 35 U.S.C. § 371 of International Patent Application No. PCT/KR2022/001728 filed Feb. 4, 2022, which claims the benefit of priority from Korean Patent Application Nos. 10-2021-0016656 filed Feb. 5, 2021, and 10-2022-0013095 filed Jan. 28, 2022, each of which is hereby incorporated herein by reference in its entirety for all purposes.

TECHNICAL FIELD

The present invention relates to a connector provided between a condenser and a receiver driver and configured to fixedly couple the condenser and the receiver driver, and a vehicle heat exchanger including the same.

BACKGROUND ART

A heat exchanger refers to a device disposed between two environments having a temperature difference and configured to absorb heat from one environment and discharge the heat to the other environment. The heat exchanger serves as a cooling system when the heat exchanger absorbs heat from an interior and discharges the heat to the outside. The heat exchanger serves as a heating system when the heat exchanger absorbs heat from the outside and discharges the heat to the interior. The heat exchanger basically includes an evaporator configured to absorb heat from the periphery, a compressor configured to compress a heat exchange medium, a condenser configured to discharge heat to the periphery, and an expansion valve configured to expand the heat exchange medium.

In a cooling device, an actual cooling operation is performed by the evaporator in which a liquid heat exchange medium is vaporized by absorbing the amount of heat corresponding to vaporization heat from the periphery. A gaseous heat exchange medium, which is introduced into the compressor from the evaporator, is compressed into a high-temperature, high-pressure heat exchange medium by the compressor, and the compressed gaseous heat exchange medium is liquefied while passing through the condenser, such that liquefaction heat is discharged to the periphery. The liquefied heat exchange medium is converted into low-temperature, low-pressure wet saturated vapor while passing through the expansion valve again, and then the heat exchange medium is introduced into the evaporator again. Therefore, these processes define a cycle.

As described above, a high-temperature, high-pressure gaseous refrigerant is introduced into the condenser. The refrigerant is condensed into a liquid refrigerant and then discharged while discharging liquefaction heat through heat exchange. FIGS. 1 to 3 illustrate the condenser in the related art.

The condenser, which is illustrated in FIGS. 1 and 2, includes: first and second header tanks 11 and 12 spaced apart from each other at a predetermined distance and provided side by side; inlet and outlet pipes 31 and 32 provided in the second header tank 12 to introduce or discharge the refrigerant; a plurality of tubes 40 each having two opposite ends fixed to the first and second header tanks 11 and 12 and configured to define refrigerant flow paths; a plurality of fins 50 stacked between the tubes 40; and a receiver dryer 60 provided at one side of the first header tank 11 and configured to separate a gaseous refrigerant and a liquid refrigerant. The receiver dryer 60 and the first header tank 11 are connected to a blind connector 80 so that the receiver dryer 60 and the first header tank 11 are fixed together with a transfer connector 70 in which the refrigerant actually flows.

In addition, a flow inside the condenser will be described. The high-temperature, high-pressure gaseous refrigerant compressed by the compressor is introduced into an inlet pipe of the first header tank and flows to the second header tank by a baffle provided in the first header tank. In this case, because the refrigerant is already condensed in the condenser, the gaseous and liquid refrigerants are mixed. In general, the gaseous refrigerant flows upward, and the liquid refrigerant flows downward. The refrigerant, which is trapped at a lower side of the receiver dryer after flowing along flow paths formed by the baffle and then passing through upper and lower regions, is mostly the collected liquid refrigerant. The liquid refrigerant is supercooled while passing through a supercooling region, such that the enthalpy of the refrigerant may be further reduced, thereby improving cooling efficiency.

FIG. 3A illustrates the transfer connector 70, and FIG. 3B illustrates the blind connector 80. The transfer connector 70 includes a first body 71 having a hollow fixing groove, and a stationary pipe 72 inserted into the fixing groove and configured to define a space in which the refrigerant is transferred. The blind connector 80 includes a second body 81, and first and second protruding portions 82 and 82 protruding from two opposite sides of the second body 81. That is, the transfer connector 70 and the blind connector 80 have similar shapes, except for whether the refrigerant may flow therein.

Meanwhile, the header tank of the heat exchanger may be generally made of a clad material in view of a shape and process method thereof. However, the connector and the receiver dryer are difficult to manufacture by using a clad material because of the characteristics thereof. Therefore, because the header tank is made of a clad material, a connector, which is coupled to the header tank and brazed, does not require a separate clad material. However, a connector coupled to the receiver dryer needs to have a separate clad material for brazing.

To this end, in the related art, a separate clad ring is inserted into a receiver dryer side of the connector. In this case, after the brazing, the clad ring excessively moves to a welding space in accordance with a brazing condition. For this reason, there is a problem in that a gap is formed at an original position, and a water leakage occurs through the gap, which causes defective quality and external appearance.

Document of Related Art (Patent Document 1) Korean Patent Application Laid-Open No. 2017-0047963 (May 8, 2017)

DISCLOSURE

Technical Problem

The present invention has been made in an effort to solve the above-mentioned problem, and an object of the present invention is to provide a connector capable of improving coupling properties and weldability between a receiver dryer and the connector, and a vehicle heat exchanger including the same.

Technical Solution

A connector according to one example of the present invention is a connector provided between a condenser and a receiver dryer, and the connector may include: a body including one surface facing the condenser, and the other surface facing the receiver dryer; a first protruding portion protruding outward from one surface of the body so as to be inserted into a coupling hole of the condenser; and a second protruding portion protruding outward from the other surface of the body so as to be inserted into a coupling hole of the receiver dryer, in which the second protruding portion is made of a clad material.

The second protruding portion may be formed by inserting a clad plate having a pipe shape into the other surface of the body.

An insertion groove, which is recessed toward the inside of the body, may be formed in a central portion of the other surface of the body, and one side of the clad plate may be inserted into the insertion groove.

A pipe seating groove, which is recessed along a periphery of a bottom surface of the insertion groove, may be formed in the bottom surface of the insertion groove so that one end of the clad plate is inserted and seated into the pipe seating groove.

The first protruding portion may be integrated with the body.

An outer diameter of the second protruding portion may be smaller than an outer diameter of the first protruding portion.

The first and second protruding portions of the connector may each protrude in a pipe shape, and a portion between the first and second protruding portions may be blocked by the body.

The condenser may include a header tank, and one surface of the body may be recessed while corresponding to an outer peripheral surface of the header tank so as to be seated on the outer peripheral surface of the header tank.

The condenser may include a core part formed by stacking a plurality of flat plates, and one surface of the body may be formed to be flat so as to be joined to an outer surface of the core part.

The other surface of the body may be recessed while corresponding to an outer peripheral surface of the receiver dryer so as to be seated on the outer peripheral surface of the receiver dryer.

A vehicle heat exchanger according to one example of the present invention may include: a condenser; a receiver dryer; and a connector according to one example provided between the condenser and the receiver dryer.

A connector according to another example of the present invention is a connector provided between a condenser and a receiver dryer, and the connector may include: a body including one surface facing the condenser, and the other surface facing the receiver dryer; a first protruding portion protruding outward from one surface of the body so as to be inserted into a coupling hole of the condenser; a second protruding portion protruding outward from the other surface of the body so as to be inserted into a coupling hole of the receiver dryer; and a ring-shaped seating member provided at the other surface of the body and inserted into an outer side of the second protruding portion so as to surround an outer periphery of the second protruding portion, in which the seating member is made of a clad material.

A seating member seating groove, which is recessed along an outer periphery of the second protruding portion, may be formed in the other surface of the body so that the seating member is inserted and seated into the seating member seating groove.

One or more through-holes may be formed in the seating member, and a protrusion may be formed in the seating member seating groove and disposed at a position corresponding to the through-hole.

The first protruding portion and the second protruding portion may be integrated with the body.

An outer diameter of the second protruding portion may be smaller than an outer diameter of the first protruding portion.

The first and second protruding portions of the connector may each protrude in a pipe shape, and a portion between the first and second protruding portions may be blocked by the body.

The condenser may include a header tank, and one surface of the body may be recessed while corresponding to an outer peripheral surface of the header tank so as to be seated on the outer peripheral surface of the header tank.

The condenser may include a core part formed by stacking a plurality of flat plates, and one surface of the body may be formed to be flat so as to be joined to an outer surface of the core part.

The other surface of the body may be recessed while corresponding to an outer peripheral surface of the receiver dryer so as to be seated on the outer peripheral surface of the receiver dryer.

A vehicle heat exchanger according to another example of the present invention may include: a condenser; a receiver dryer; and a connector according to another example provided between the condenser and the receiver dryer.

Advantageous Effects

According to the present invention, the second protruding portion may be configured as the pipe-shaped clad plate or the ring-shaped clad seating member is provided on the outer periphery of the second protruding portion. In this case, the seating groove, into which the clad plate or the clad seating member may be inserted and seated, is formed in the body. Therefore, it is possible to increase the fixing force between the clad plate, the clad seating member, and the body.

In addition, it is possible to solve the problem in which a gap is formed as the body or the clad material moves during brazing in the related art, and defective coupling occurs between the connector and the receiver dryer.

EXPLANATION OF REFERENCE NUMERALS AND SYMBOLS

Figure 1:
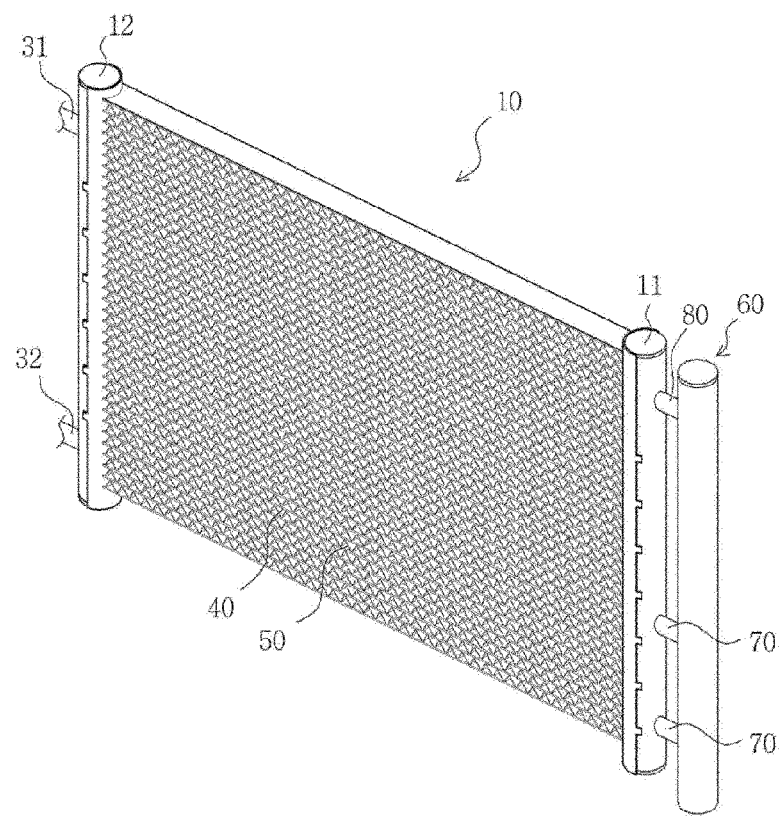
FIG. 1 is a perspective view illustrating a condenser in the related art.
Figure 2:
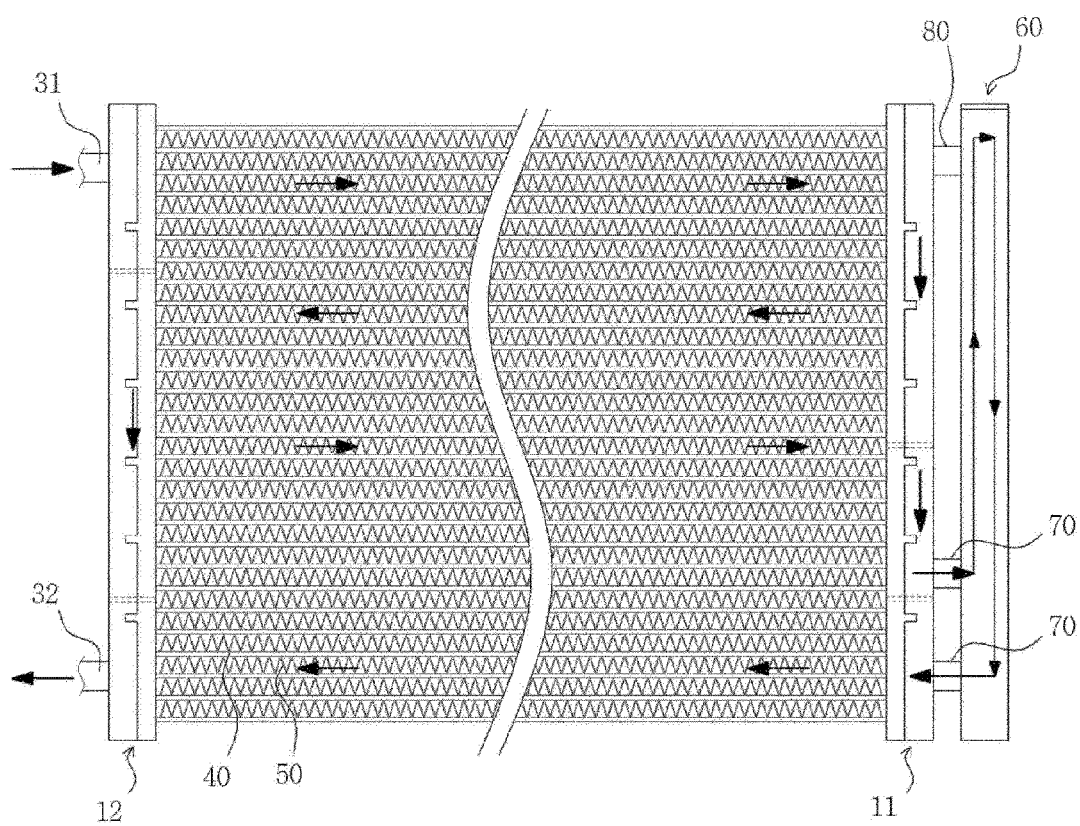
FIG. 2 is a view illustrating a flow of a refrigerant in a condenser illustrated in FIG. 1.
Figure 3:
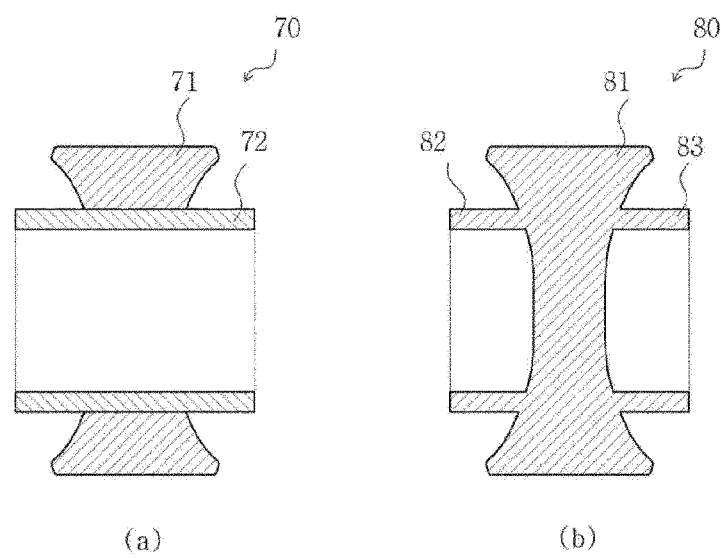
FIG. 3 is a cross-sectional view of a transfer connector and a blind connector in the related art.

1: Vehicle heat exchanger
10: Condenser
10C: Core part
11: Header tank at one side of condenser
11H: Coupling hole
60: Receiver dryer
60H: Coupling hole
70: Transfer connector
80: Blind connector
80A: Connector according to first example
80B: Connector according to second example
100: Body
120: One surface of body
130: The other surface of body
131: Clad plate insertion groove
132: Pipe seating groove
135: Seating member seating groove
136: Protrusion
200: First protruding portion
300: Second protruding portion
300': Clad plate
400: Seating member
410: Through-hole

BEST MODE

Hereinafter, the present invention will be described in detail with reference to the accompanying drawings.

Figure 4:
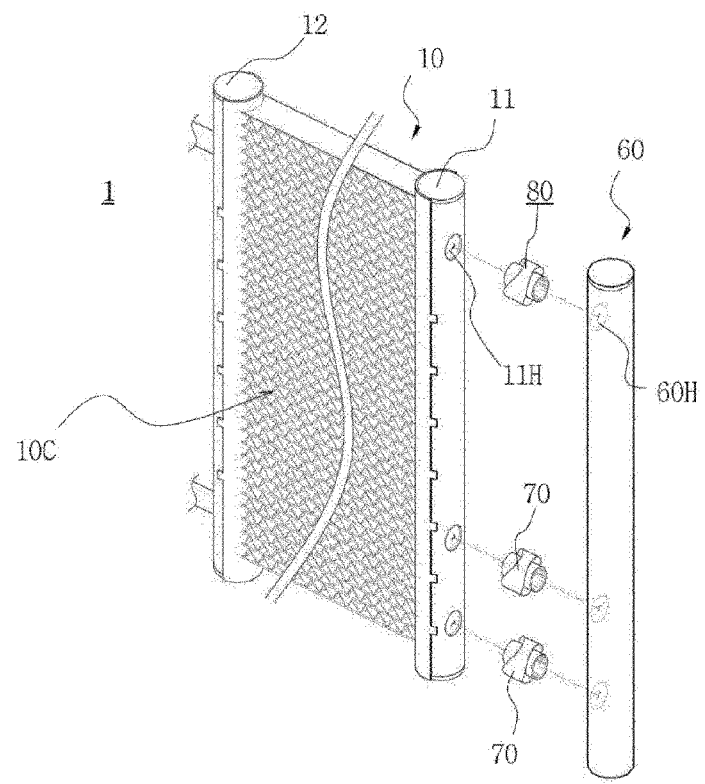
FIG. 4 is an exploded perspective view of a vehicle heat exchanger according to one example of the present invention.
Figure 5:
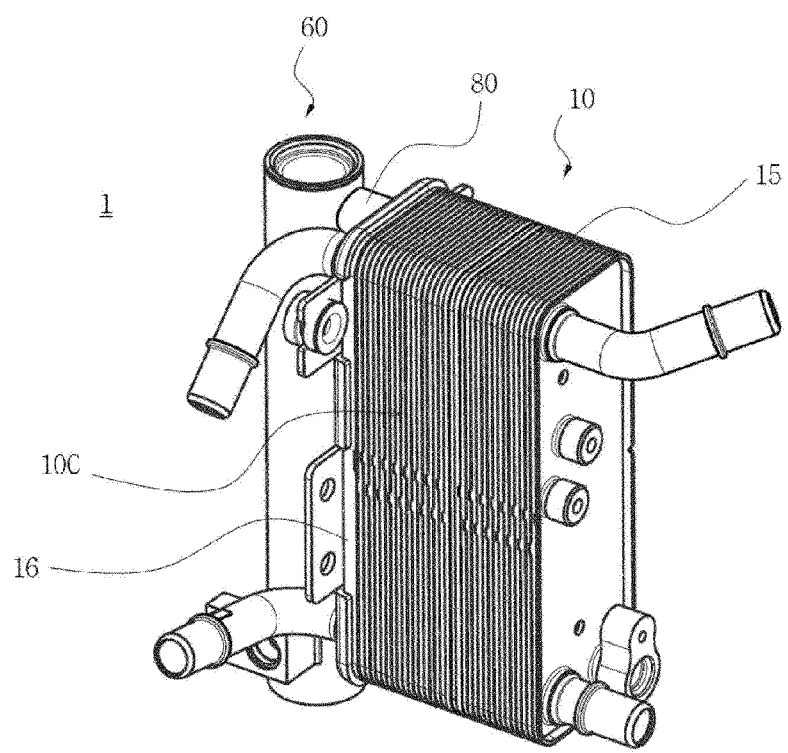
FIG. 5 is a perspective view of a vehicle heat exchanger according to another example of the present invention.
Figure 6:
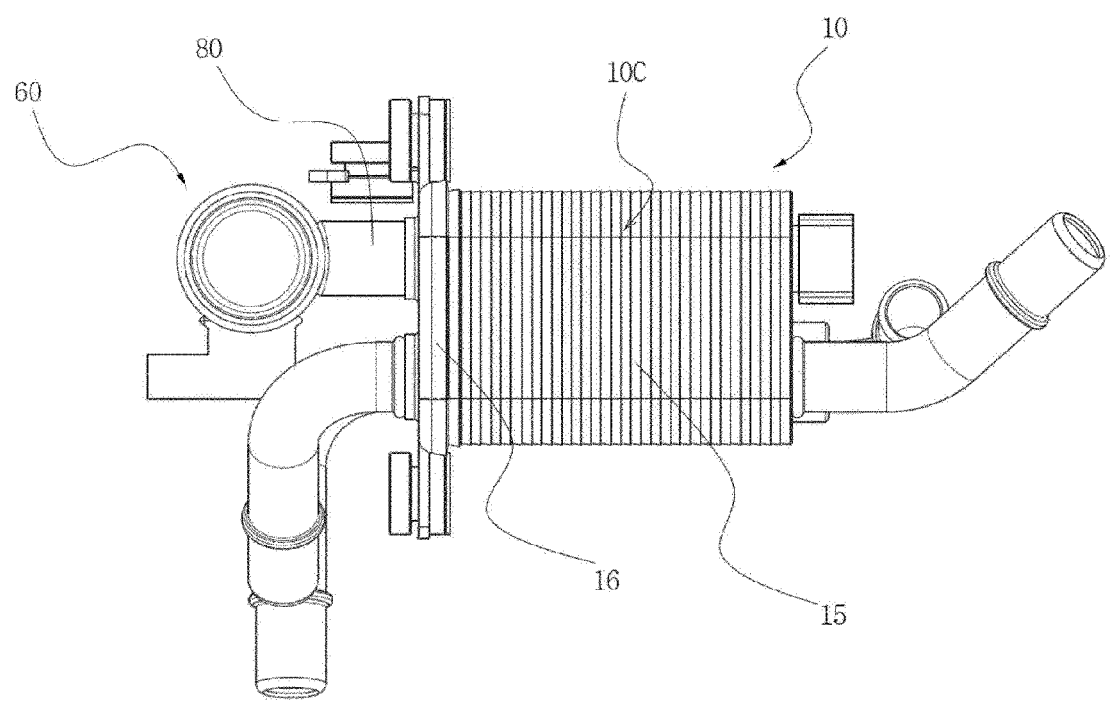
FIG. 6 is a top plan view of the vehicle heat exchanger in FIG. 5 when viewed from above.

FIG. 4 is an exploded perspective view of a vehicle heat exchanger according to one example of the present invention, FIG. 5 is a perspective view of a vehicle heat exchanger according to another example of the present invention, and FIG. 6 is a top plan view of the vehicle heat exchanger in FIG. 5 when viewed from above. As illustrated in the drawings, a vehicle heat exchanger 1 of the present invention may broadly include a condenser 10, a receiver dryer 60, and connectors 70 and 80 provided between the condenser 10 and the receiver dryer 60.

The heat exchanger 1 in FIG. 4 is a heat exchanger in which a condenser 10 is configured as an air-cooled condenser in which outside air and a refrigerant exchange heat with each other. The air-cooled condenser may have a structure in which a core part 10C including a plurality of tubes and a plurality of fins is provided at a central portion, and header tanks 11 and 12 are provided at one end or two opposite ends of the core part 10C. Further, the receiver dryer 60 may be connected and fixed to the condenser 10 through the connector 80 and the header tank 11 provided at one side of the core part 10C.

The heat exchanger 1 in FIGS. 5 and 6 is a heat exchanger in which the condenser 10 is configured as a water-cooled condenser in which a coolant and a refrigerant exchange heat with each other. The water-cooled condenser may have a structure in which a plurality of plates 15 is stacked, and the coolant and the refrigerant alternately flow between the plates 15 while exchanging heat with each other. The plurality of plates 15 may constitute the core part 10C, and a connection plate 16 may be provided outside the core part 10C. Further, the receiver dryer 60 may be connected and fixed to the condenser 10 through the connector 80 and the plate 15 integrated with the core part 10C or a separate connection plate 16 integrated with the core part 10C.

In this case, the connector 80 of the present invention may be a blind connector having a closed interior. As described above in the background art section, the blind connector may have substantially the same structure as the transfer connector in which a refrigerant may flow. However, the blind connector is partially different from the transfer connector in that a portion between a first protruding portion and a second protruding portion is blocked by a body, and the refrigerant does not flow therebetween.

Meanwhile, regarding the structure of the connector 80 of the present invention to be described below, there is a difference in that one surface of the connector 80 is coupled to the header tank or coupled to the plate of the core part in a case in which the connector 80 is applied to the air-cooled condenser and a case in which the connector 80 is applied to the water-cooled condenser. Therefore, there may be a difference in that a shape of one surface of the connector is a concavely recessed shape corresponding to an outer peripheral surface of the header tank or a shape of one surface of the connector is a flat shape corresponding to an outer surface of the plate. The other structures may remain the same in the two cases. The further details will be described below.

Hereinafter, the blind connector 80 of the present invention will be described with reference to specific embodiments.

First, a blind connector 80A according to a first embodiment will be described.

Figure 7:
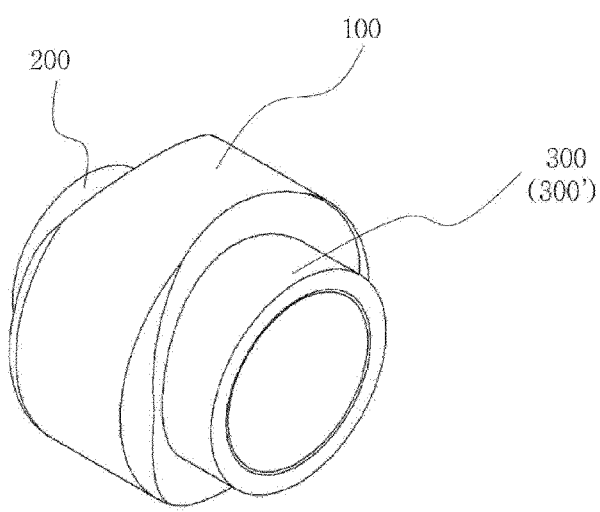
FIG. 7 is a perspective view of a blind connector according to a first embodiment of the present invention.
Figure 8:
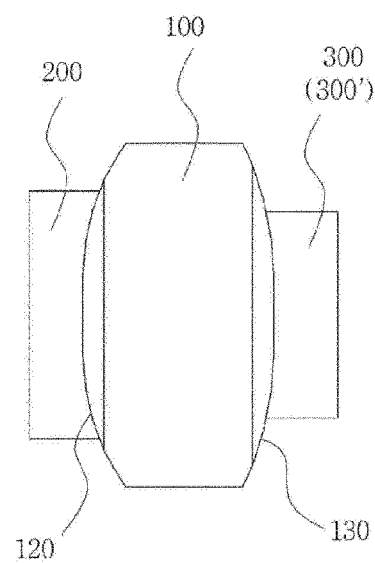
FIG. 8 is a side view of FIG. 7.
Figure 9:
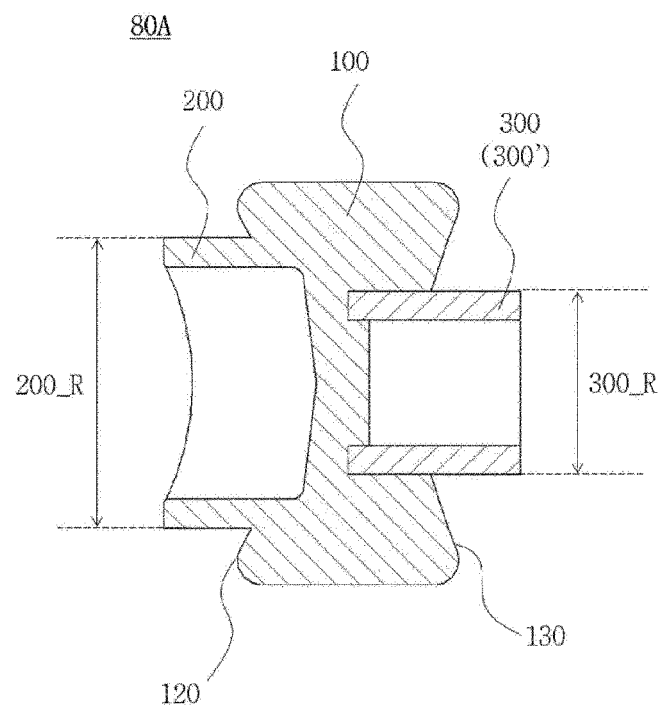
FIG. 9 is a cross-sectional view of FIG. 8.
Figure 10:
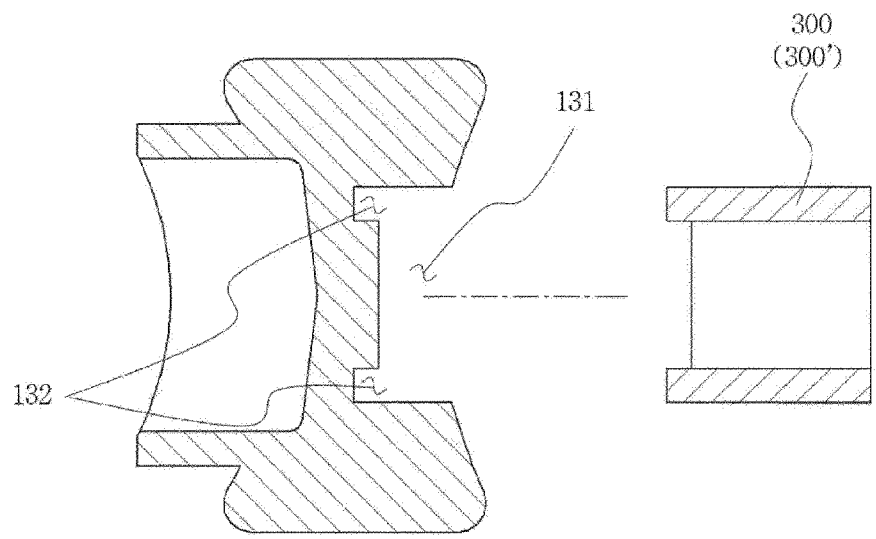
FIG. 10 is an exploded view of FIG. 9.

FIG. 7 is a perspective view of the blind connector according to the first embodiment of the present invention, FIG. 8 is a side view of FIG. 7, FIG. 9 is a cross-sectional view of FIG. 8, and FIG. 10 is an exploded view of FIG. 9. As illustrated in the drawings, the blind connector 80A of the present invention includes a body 100 corresponding to the central portion of the connector, and first and second protruding portions 200 and 300 respectively protruding from two opposite sides of the body.

The body 100 includes one surface 120 formed to be directed toward the condenser 10, i.e., one surface 120 facing the condenser 10, and the other surface 130 formed to be directed toward the receiver dryer 60, i.e., the other surface facing the receiver dryer 60. The body 100 may have a structure having a closed interior.

A first protruding portion 200 may be provided at one side of the body 100 and protrude outward from one surface of the body 100 so as to be inserted into a coupling hole of the condenser, more specifically, a coupling hole 11H formed in the header tank 11 at one side in the example in FIG. 4 or a coupling hole (not illustrated) formed in the separate connection plate 16 or the plate integrated with the core part 10C in the example in FIG. 5. In this case, the first protruding portion 200 may be integrated with the body 100.

A second protruding portion 200 may be provided at the other side of the body 100 and protrude outward from the other surface of the body 100 so as to be inserted into a coupling hole of the receiver dryer, more specifically, a coupling hole 60C formed in the receiver dryer 60 in the example in FIG. 4 or a coupling hole (not illustrated) formed in the receiver dryer 60 in the example in FIG. 5.

As described above, the first protruding portion 200 formed on the body 100 is inserted into the condenser side coupling hole, and the second protruding portion 300 is inserted into the receiver dryer side coupling hole, such that a distance between the condenser and the receiver dryer may be increased, and the receiver dryer may be fixed to the condenser.

In this case, in the present invention, the second protruding portion 300 may be made of a clad material.

Figure 11:
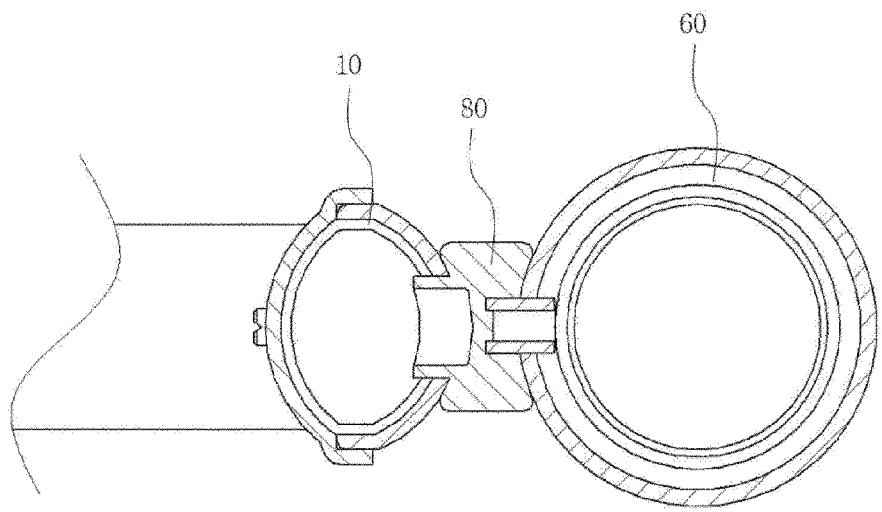
FIG. 11 is a cross-sectional view illustrating a state in which the blind connector is coupled to peripheral components.

As described above, because the receiver dryer is difficult to manufacture by using a clad material because of characteristics thereof, it is necessary to additionally provide a clad material, which is a brazing material, in order to implement brazing coupling between the connector and the receiver dryer. According to the present invention, because the second protruding portion is made of a clad material, welding only needs to be performed without change in the state in which the second protruding portion is inserted into the coupling hole of the receiver dryer. Therefore, the number of assembling processes may be reduced, and the assembling process may be easily performed. FIG. 11 is a cross-sectional view illustrating a state in which the connector 80 is coupled to peripheral components, i.e., the header tank 10 at one side and the receiver dryer 60 at the other side.

In this case, the second protruding portion 300 of the present invention may be formed by inserting a clad plate 300' into the other surface of the body 100. Specifically, with reference to FIGS. 9 and 10, the connector 80A of the present invention may have a structure in which an insertion groove 131, which is recessed toward the inside of the body 100, is formed in a central portion of the other surface 130 of the body 100, and a part of one side of the clad plate 300', which is made of a clad material and has a pipe shape, is inserted into the insertion groove 131 of the body formed as described above.

In this case, an inner diameter of the insertion groove 131 and an outer diameter of the clad plate 300' are substantially equal to each other so that an inner peripheral surface of the insertion groove 131 and an outer peripheral surface of the clad plate 200' are in contact with each other. Therefore, the clad plate 300' may be fixedly fitted with the insertion groove 131.

That is, in the case of the blind connector 80A according to the present example, the clad plate 300' is inserted into a side opposite to the first protruding portion 200 in the structure in which the first protruding portion 200 is integrated with the body 100, such that the clad plate 300' may define the second protruding portion 300 of the body 100. In this case, the pipe-shaped clad plate 300' has a structure in which an outer clad is provided on an inner base material, only the outer clad is used as a brazing material, and the base material is used without change when the clad plate 300' is coupled to the receiver dryer 6 by brazing. Therefore, it is possible to solve a problem in which a gap is formed by brazing, and defective coupling occurs between the connector and the receiver dryer.

Further, with reference back to FIG. 10, the blind connector 80A in the present example may have a pipe seating groove 132 recessed along a periphery of a bottom surface of the insertion groove 131 so that one end of the clad plate 300' is inserted and seated into the bottom surface of the insertion groove 131 of the body 100. A depth of the recessed pipe seating groove 132 may be properly designed in consideration of the structure of the first protruding portion 200 at a side opposite to a thickness of the body 100, and a width from an outer diameter to an inner diameter of the recessed pipe seating groove 132 formed circularly may be substantially equal to a thickness of the clad plate. As the pipe seating groove is provided as described above, the clad plate may be easily inserted and fixed into the insertion groove, and a coupling force between the body and the clad plate may increase.

With reference back to FIG. 9, in the case of the blind connector 80A of the present example, an outer diameter 300_R of the second protruding portion 300 may be smaller than an outer diameter 200_R of the first protruding portion 200. This may assist in easily distinguishing the first protruding portion and the second protruding portion and preventing the blind connector from being coupled to the condenser and the receiver dryer in a reverse manner. In this case, in case that the second protruding portion 300 is formed by inserting the clad plate 300' into the body 100, an outer diameter of the second protruding portion 300 may correspond to an outer diameter of the clad plate 300'.

In addition, as illustrated in FIGS. 9 and 10, in the case of the connector 80A of the present example, the first protruding portion 200 may have a hollow interior and be provided in the form of a pipe having a body side cross-section closed by the body 100. Alternatively, the first protruding portion 200 may be formed in a cylindrical shape having an entirely sold interior. Further, the first protruding portion 200 and the body 100 may be integrally manufactured by means of a single mold. Therefore, the first protruding portion 200 and the body 300 may be made of the same material.

Next, a blind connector 80B according to a second embodiment of the present invention will be described.

Figure 12:
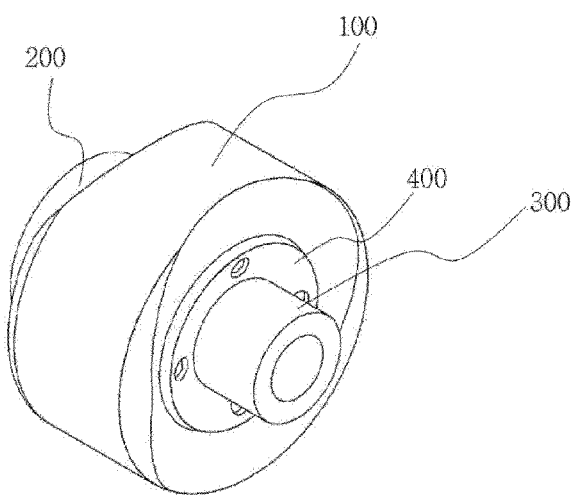
FIG. 12 is a perspective view of a blind connector according to a second example of the present invention.
Figure 13:
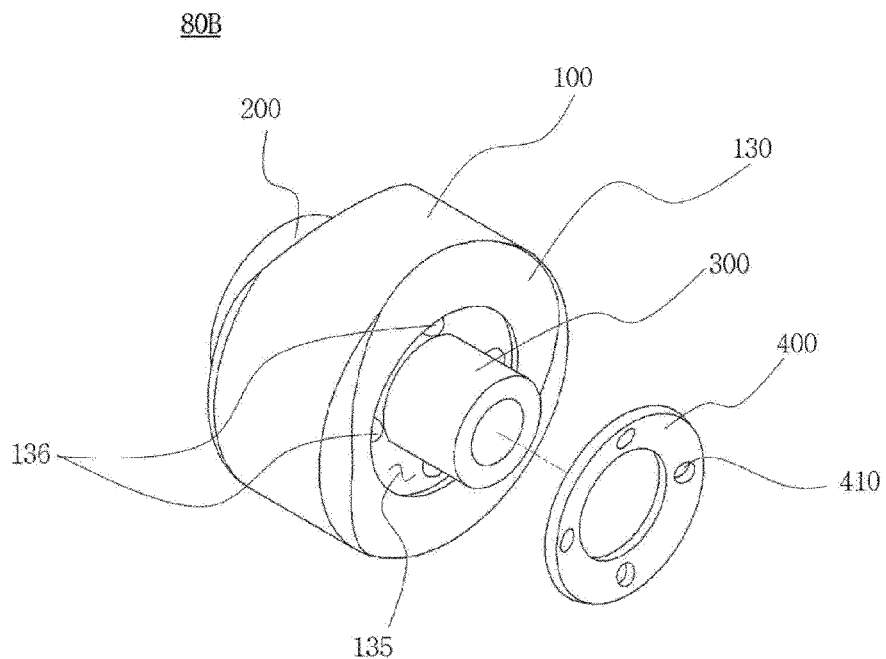
FIG. 13 is an exploded perspective view of FIG. 12.
Figure 14:
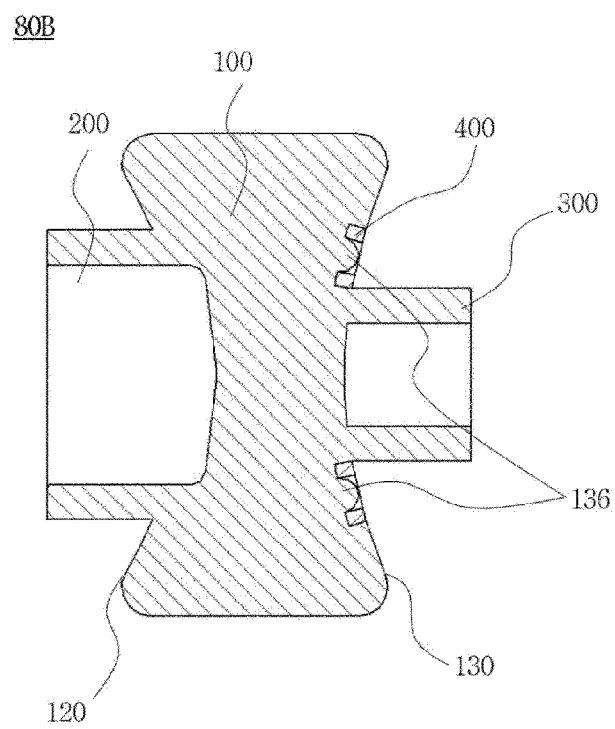
FIG. 14 is a cross-sectional side view of FIG. 12.
Figure 15:
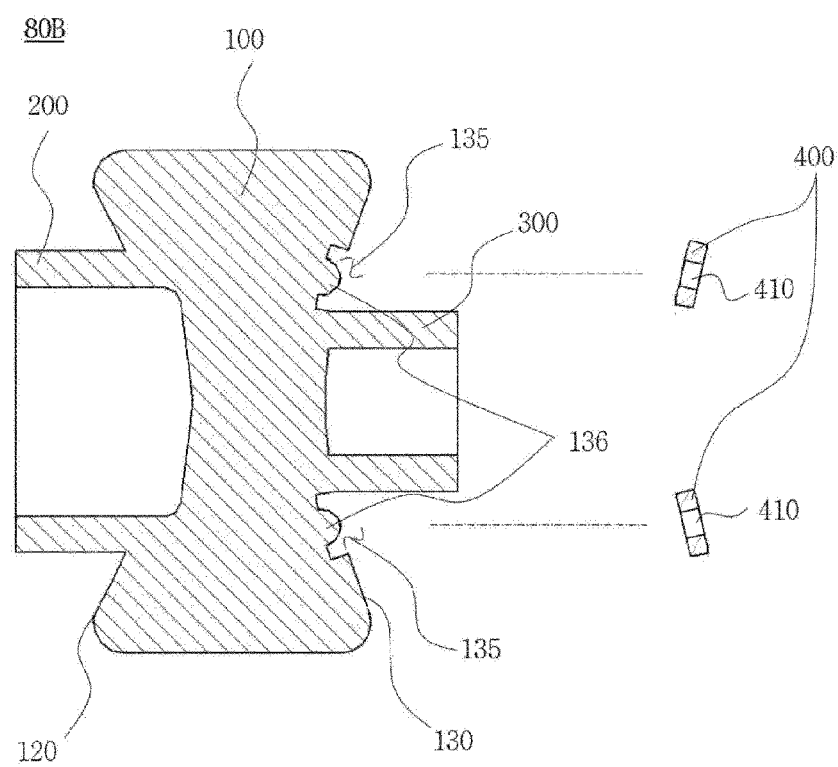
FIG. 15 is an exploded view of FIG. 14.

FIG. 12 is a perspective view of the blind connector according to the second example of the present invention, FIG. 13 is an exploded perspective view of FIG. 12, FIG. 14 is a cross-sectional side view of FIG. 12, and FIG. 15 is an exploded view of FIG. 14. As illustrated in the drawings, the connector 80B of the present example includes the body 100 corresponding to the central portion of the connector, and the first and second protruding portion 200 and 300 protruding from two opposite sides of the body. In this case, unlike the first example, the connector 80B may further include a ring-shaped seating member 400 formed to surround an outer periphery of the second protruding portion 300.

The body 100 is identical to that described above. The first protruding portion 200 and the second protruding portion 300 may respectively protrude outward from one surface 120 and the other surface 130 of the body 100, as described above. However, in the case of the present example, the first protruding portion 200 and the second protruding portion 300 are integrated with the body 100, such that the first protruding portion 200, the body 100, and the second protruding portion 300 may be defined as a single structure. That is, all the first protruding portion 200, the body 100, and the second protruding portion 300 may be integrally manufactured by using a single mold and thus made of the same material.

As described above, in the structure in which the first protruding portion 200, the body 100, and the second protruding portion 300 of the connector 80B of the present example are integrated as described above, the seating member 400 is inserted into an outer side of the second protruding portion 300. The seating member 400 may have a circular, thin plate-shaped ring shape. The seating member 400 may be configured as a kind of washer. The seating member 400 is inserted into the second protruding portion 300 through a hole formed in a central portion. More specifically, the seating member 400 is inserted into the outer side of the second protruding portion 300 to surround an outer periphery of the second protruding portion 300 and thus provided at the other surface 130 of the body 100.

In this case, the seating member 400 may be made of a clad material. Therefore, the brazing may be performed between the receiver dryer 6 and the connector 80 of the present invention. That is, in the present invention, the connector itself may have the washer made of a clad material, such that the brazing may be performed on a wide area.

With reference to FIG. 13, the connector 80B of the present example may have a seating member seating groove 135 recessed along an outer periphery of the second protruding portion 300 so that the seating member 400 is inserted and seated into the other surface 130 of the body 100. The recessed shape of the seating member seating groove 135 may correspond to the shape of the seating member 400. A depth of the recessed seating member seating groove 135 may be approximately half a thickness of the seating member 400. However, the depth of the recessed seating member seating groove is not limited thereto. The depth of the recessed seating member seating groove may be appropriately designed in consideration of the thickness of the seating member 400 and the like.

With reference to FIGS. 13 to 15, one or more through-holes 410, which are formed through the seating member 400, may be formed in the seating member 400. Protrusions 136, which protrude outward from the seating member seating groove 135, may be formed in the seating member seating groove 135 and disposed at positions corresponding to the through-holes 410. Therefore, when the seating member 400 is seated in the seating member seating groove 135, the protrusion 136 formed on the seating member seating groove 135 may be inserted into the through-hole 410 of the seating member 400.

As described above, according to the present example, the seating member seating groove 135 is formed at the other surface 130 of the body 100, and the seating member seating groove 135 is fixedly inserted into the seating member 400, such that a fixing force between the seating member and the body may increase. Further, the through-hole 410 formed in the seating member and the protrusion 136 formed on the seating member seating groove 135 are coupled to each other by insertion, such that a fixing force between the seating member and the body may further increase.

In addition, likewise, even in the present example, an outer diameter of the second protruding portion 300 may be smaller than an outer diameter of the first protruding portion 200 so that the first protruding portion 200 and the second protruding portion 300 are easily distinguished.

Hereinafter, one surface 120 and the other surface 130 of the body 100 of the connector will be described in more detail.

The connector in FIGS. 9 and 14 is a connector applied to the heat exchanger in FIG. 4. As illustrated, the condenser 10 is an air-cooled condenser and includes the header tank 11 on at least one side thereof. In this case, one surface 120 of the body 100 of the connector, which faces the condenser, may be recessed while corresponding to the outer peripheral surface of the header tank 11 so as to be seated to be in close contact with the outer peripheral surface of the header tank 11. That is, in the case of the present example, one side of the connector 80 is coupled to the header tank 11 having a circular pipe shape. Therefore, one surface 120 of the body may be provided in the form of a groove semi-circularly recessed and having a curvature equal to that of the outer peripheral surface of the header tank 11.

Figure 16:
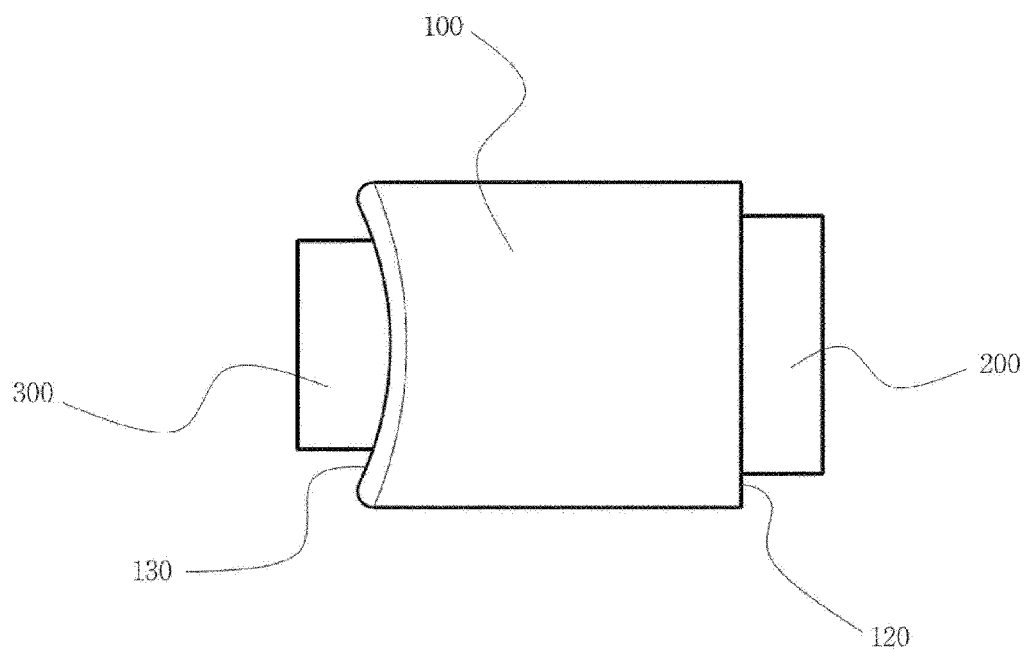
FIG. 16 is a side view of a connector in FIG. 5.
Figure 17:
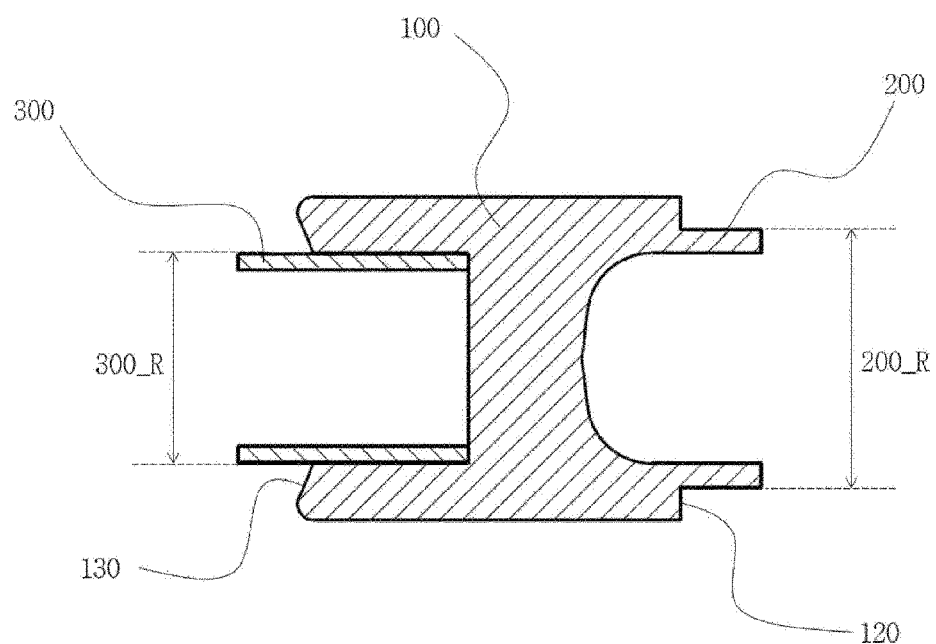
FIG. 17 is a cross-sectional view of FIG. 16.

Alternatively, in the case of the connector applied to the heat exchanger in FIG. 5, one surface 120 of the body 100 of the connector may be formed to be flat. That is, the condenser 10 in FIG. 5 may be a water-cooled condenser and include the core part 10C formed by stacking a plurality of flat plates. In this case, the connection plate 16 or the plate 15 integrated with the core part 10C may be disposed on an outer surface of the core part 10C, and thus the outer surface of the core part 10C may be formed to be flat. Therefore, one surface 120 of the body 100 of connector may be formed to be flat so as to be in close contact with and joined to the outer surface of the core part 10C. FIG. 16 is a side view of a connector in FIG. 5, and FIG. 17 is a cross-sectional view of FIG. 16. As illustrated, one surface 120 of the body may have a flat structure.

With reference to FIGS. 9, 14, and 16 and the like, the other surface 130 of the body 100 of the connector may be recessed while corresponding to the outer peripheral surface of the receiver dryer 60 so as to be in close contact with and seated on the outer peripheral surface of the receiver dryer 60. That is, regardless of whether the condenser is the air-cooled condenser or the water-cooled condenser, the other side of the connector is coupled to the receiver dryer 60. Therefore, in the two cases, the structures of the other surface 130 of the body corresponding to the other side of the connector may be identical to each other. More specifically, because the receiver dryer 60 has a circular pipe shape, the other surface 130 of the body may be provided in the form of a groove semi-circularly recessed and having a curvature equal to that of the outer peripheral surface of the receiver dryer 60.

In this case, regardless of whether the connector is the connector coupled to the header tank or the connector coupled to the plate of the core part, the structures excluding one surface of the body may be identical to the above-mentioned structures. For example, as illustrated in FIG. 17, an outer diameter 300R of the second protruding portion may be smaller than an outer diameter 200R of the first protruding portion. Alternatively, although not illustrated, the second protruding portion 300 may be made of a clad material, or the ring-shaped the seating member 400 may, of course, be provided on the second protruding portion 300.

In addition, the configuration has been described above in which the connector of the present invention is the blind connector. However, the structure of the connector of the present invention may be configured as a transfer connector, in which a refrigerant may flow, by forming a flow path that penetrates the interiors of the pipe-shaped first protruding portion, the second protruding portion, and the body.

While the embodiments of the present invention have been described with reference to the accompanying drawings, those skilled in the art will understand that the present invention may be carried out in any other specific form without changing the technical spirit or an essential feature thereof. Therefore, it should be understood that the above-described embodiments are illustrative in all aspects and do not limit the present invention.

What is claimed is:

1. A connector, which is provided between a condenser and a receiver dryer, the connector comprising:
    a body including one surface facing the condenser, and the other surface facing the receiver dryer;
    a first protruding portion protruding outward from one surface of the body so as to be inserted into a coupling hole of the condenser; and a second protruding portion protruding outward from the other surface of the body so as to be inserted into a coupling hole of the receiver dryer, wherein the second protruding portion is made of a clad material, wherein the second protruding portion is formed by inserting a clad plate having a pipe shape into the other surface of the body, wherein an insertion groove, which is recessed toward the inside of the body, is formed in a central portion of the other surface of the body, and one side of the clad plate is inserted into the insertion groove and fitted with the insertion groove, wherein the first protruding portion is integrated with the body, and the first protruding portion is made of the same material as the body, and wherein the condenser comprises a core part formed by stacking a plurality of flat plates, and one surface of the body is formed to be flat so as to be joined to an outer surface of the core part, wherein the other surface of the body is recessed while corresponding to an outer peripheral surface of the receiver dryer so as to be seated on the outer peripheral surface of the receiver dryer.

2. The connector of claim 1, wherein a pipe seating groove, which is recessed along a periphery of a bottom surface of the insertion groove, is formed in the bottom surface of the insertion groove so that one end of the clad plate is inserted and seated into the pipe seating groove.

3. The connector of claim 1, wherein an outer diameter of the second protruding portion is smaller than an outer diameter of the first protruding portion.

4. The connector of claim 1, wherein the first and second protruding portions of the connector each protrude in a pipe shape, and a portion between the first and second protruding portions is blocked by the body.

5. A vehicle heat exchanger comprising:
a condenser;
a receiver dryer; and
a connector according to claim 1 provided between the condenser and the receiver dryer.

* * * * *